(12) United States Patent
Heimberger (10) Patent No.: US 11,878,681 B2
(45) Date of Patent: Jan. 23, 2024

(54) METHOD FOR OPERATING A VEHICLE, PARKING ASSISTANCE SYSTEM AND VEHICLE

(71) Applicant: Valeo Schalter und Sensoren GmbH, Bietigheim-Bissingen (DE)

(72) Inventor: Marco Heimberger, Bietigheim-Bissingen (DE)

(73) Assignee: VALEO SCHALTER UND SENSOREN GMBH, Bietigheim-Bissingen (DE)

( * ) Notice: Subject to any disclaimer, the term of this patent is extended or adjusted under 35 U.S.C. 154(b) by 0 days.

(21) Appl. No.: 17/784,854

(22) PCT Filed: Dec. 8, 2020

(86) PCT No.: PCT/EP2020/085037
§ 371 (c)(1),
(2) Date: Jun. 13, 2022

(87) PCT Pub. No.: WO2021/116087
PCT Pub. Date: Jun. 17, 2021

(65) Prior Publication Data
US 2023/0052549 A1 Feb. 16, 2023

(30) Foreign Application Priority Data
Dec. 13, 2019 (DE) ............ 10 2019 134 309.7

(51) Int. Cl.
*B60W 30/06* (2006.01)
*G08G 1/14* (2006.01)
*G08G 1/16* (2006.01)

(52) U.S. Cl.
CPC ............. *B60W 30/06* (2013.01); *G08G 1/141* (2013.01); *G08G 1/146* (2013.01); *G08G 1/168* (2013.01)

(58) Field of Classification Search
CPC ....... B60W 30/06; G08G 1/141; G08G 1/146; G08G 1/168
See application file for complete search history.

(56) References Cited

U.S. PATENT DOCUMENTS 10,583,829 B2 *  3/2020 Kim .................... B62D 15/028
2008/0129544 A1 *  6/2008 Augst ................. B62D 15/0285
                                                    340/932.2
(Continued)

FOREIGN PATENT DOCUMENTS

DE    102006050550 A1    4/2008
DE    102013224198 A1    5/2015
(Continued)

OTHER PUBLICATIONS

International Search Report and Written Opinion in corresponding International Application No. PCT/EP2020/085037, dated Mar. 10, 2021 (14 pages).
(Continued)

*Primary Examiner* — Mohamed Barakat
(74) *Attorney, Agent, or Firm* — Osha Bergman Watanabe & Burton LLP (57) ABSTRACT

A method for operating a first vehicle (100) with a parking assistance system (110) is proposed, comprising: a) sensing an obstructing parked position (BP) of the first vehicle (100) by means of the parking assistance system (110), wherein the obstructing parked position (BP) is a parked position which adjoins a parking space (PP) occupied by a parked second vehicle (150), b) reception of a sensor signal, acquired by a sensor apparatus (120, 130) of the vehicle (100), by means of the parking assistance system (110), c) detecting a request to exit a parking space of the parked second vehicle (150) in accordance with the received sensor signal by means of the parking assistance system (110), and d) autonomously driving the first vehicle (100) from the
(Continued)

obstructing parked position (BP) into a position which is different from the obstructing parked position (BP) in accordance with the detected request to exit a parking space by means of the parking assistance system (110).

19 Claims, 4 Drawing Sheets

(56) References Cited

U.S. PATENT DOCUMENTS

| | | | | |
|---|---|---|---|---|
| 2015/0149022 A1* | 5/2015 | Harvey | .................. | G05B 15/02 |
| | | | | 701/23 |
| 2017/0329341 A1 | 11/2017 | Rakshit et al. | | |
| 2017/0355307 A1* | 12/2017 | Ha | .......................... | G08G 1/143 |
| 2018/0244267 A1* | 8/2018 | Iske | ..................... | G05D 1/0011 |
| 2019/0111916 A1* | 4/2019 | Lee | ....................... | G05D 1/0088 |

FOREIGN PATENT DOCUMENTS

| | | |
|---|---|---|
| DE | 102015218350 A1 | 3/2017 |
| DE | 102017204174 A1 | 9/2018 |
| DE | 102017218536 A1 | 4/2019 |

OTHER PUBLICATIONS

German Search Report issued in corresponding German Application No. 10 2019 134 309.7, dated Aug. 24, 2020 (5 pages).

* cited by examiner

METHOD FOR OPERATING A VEHICLE, PARKING ASSISTANCE SYSTEM AND VEHICLE

The present invention relates to a method for operating a vehicle having a parking assistance system, to a parking assistance system for a vehicle and to a vehicle having such a parking assistance system.

In larger cities, there is often a lack of parking spaces. A lengthy search for a parking space is not acceptable, in particular for delivery services, which often only have to park their vehicle for a very short time to deliver a shipment. As a result, such vehicles often stop in a second row, possibly blocking vehicles in a first row, or in inconvenient positions where they impede traffic.

DE 10 2017 204 174 A1 describes a method for the optimized use of a parking area. In this case, vehicles that are to be parked in the parking area may each be allocated a specific parking space.

DE 10 2013 224 198 A1 describes a method for the at least partially automatic leaving of a parking space by a parked first vehicle. The first vehicle is blocked in the sense that it is prevented from driving away by a second vehicle parked in a blocking parking space. The second vehicle is driven at least partially automatically out of the blocking parking space such that it releases the blocked first vehicle, and then the first vehicle is driven at least partially automatically from its parking space to a position in which it allows the second vehicle access to the blocking parking space, after which the second vehicle is driven at least partially automatically into or beyond the blocking parking space. Clearance to perform at least part of this method is in this case communicated between the first vehicle and the second vehicle and/or between the first vehicle and/or the second vehicle and a remote control device and/or between the first vehicle and/or the second vehicle and a server.

Against this background, one object of the present invention is to improve the operation of a vehicle having a parking assistance system.

Accordingly, what is proposed is a method for operating a first vehicle having a parking assistance system. In a first step a), an obstructive parking position of the first vehicle is detected by the parking assistance system, wherein the obstructive parking position is a parking position adjacent to a parking space occupied by a parked second vehicle. In a second step b), a sensor signal detected by a sensor device of the first vehicle is received by the parking assistance system. In a third step c), a desire of the parked second vehicle to leave a parking space is ascertained by the parking assistance system on the basis of the received sensor signal. In a fourth step d), the first vehicle is driven autonomously by the parking assistance system from the obstructive parking position to a position different from the obstructive parking position on the basis of the ascertained desire to leave a parking space.

This method has the advantage that the first vehicle is able to be parked in a second row without blocking a parked second vehicle in its parking space and preventing it from driving away. Furthermore, by virtue of the method, a first vehicle that is parked on a road and impairs the flow of traffic is able to be driven to an adjacent parking space that has become free, such that traffic is again able to flow unimpaired.

The parking assistance system is designed to autonomously drive the first vehicle, which may be understood in particular to be partially autonomous or fully autonomous driving of the vehicle. Partially autonomous driving is understood to mean for example that the parking assistance system controls a steering device and/or an automatic speed level system. Fully autonomous driving is understood to mean for example that the parking assistance system also controls a drive device and a braking device. The parking assistance system may be implemented in the form of hardware and/or in the form of software. In the case of an implementation in the form of hardware, the parking assistance system may be designed for example as a computer or as a microprocessor. In the case of an implementation in the form of software, the parking assistance system may be designed as a computer program product, as a function, as a routine, as part of a program code or as an executable object. The parking assistance system may in particular be designed as part of a superordinate control system of the vehicle, such as for example an ECU (Engine Control Unit). The parking assistance system may also be referred to as a driving assistance system.

The vehicle is for example a passenger car or even a truck. The vehicle comprises in particular a number of sensor devices that are designed to detect the driving state of the vehicle and/or to detect an environment of the vehicle. Examples of such sensor devices of the vehicle are image capture devices such as a camera, a radar or else a lidar, ultrasonic sensors, a microphone sensor, a location sensor, wheel angle sensors and/or wheel speed sensors. The sensor devices are each designed to output a sensor signal, for example to the parking assistance system, which performs the partially autonomous or fully autonomous driving on the basis of the received sensor signals.

The obstructive parking position of the first vehicle is in particular a parking position different from a regular parking space, for example in a second row next to parked second vehicles or on the road at a position where there is no provision for parking, such as for example on a through road adjacent to a designated parking area. The fact that the obstructive parking position is adjacent to a parking space occupied by a parked second vehicle is understood to mean in particular that a distance between the obstructive parking position and the parking space is up to 15 m, in particular up to 2, 3, 5, 7, 10 or 12 m. The obstructive parking position is distinguished in particular by the fact that the first vehicle parked in the obstructive parking position either impedes a parked second vehicle, for example preventing it from leaving a parking space and driving away, and/or impedes vehicles in moving traffic.

The obstructive parking position may be detected in particular by detecting a user input. However, provision may also be made for the parking assistance system to ascertain, on the basis of received sensor signals, such as for example image data from a camera arranged on the vehicle, that the user has parked the vehicle in the obstructive parking position.

When the obstructive parking position has been ascertained, the parking assistance system is for example switched to a specific mode in which it regularly, for example periodically, queries or receives sensor signals from one or more sensor devices of the first vehicle. It may also be said that the parking assistance system is in a listening mode. The sensor signals are in particular indicative of the environment of the vehicle, such as for example one or more parked second vehicles that are parked in an adjacent parking space. The sensor signals in this case do not necessarily emanate from the parked second vehicle itself, but rather may also emanate from a user of the second vehicle and/or a third object, such as a radio key for the second vehicle. The sensor signals comprise electromagnetic signals such as wireless data signals, optical signals such as image signals from a camera, acoustic signals such as audio signals from a microphone, haptic signals such as vibrations of the vehicle, and the like.

On the basis of the received sensor signals, the parking assistance system ascertains a desire of one of the parked second vehicles to leave a parking space. The term desire to leave a parking space is understood in particular to mean that the user or vehicle driver of the parked second vehicle would like to drive away from the parking space therewith. If an autonomous vehicle is involved, the desire to leave a parking space may also be present independently of a user of the vehicle if the vehicle is to be driven autonomously out of the parking space. The desire to leave a parking space is particularly noticeable externally and may thus be detected by the sensor devices of the first vehicle. By way of example, an unlocking signal from a radio key for one of the second vehicles may be received, followed by an optical flashing signal that emanates from the second vehicle and by way of which the second vehicle makes it possible to identify that it has received the unlocking signal and unlocked a lock. Furthermore, the opening of a door and the closing of a door, as well as the starting of an engine, may be detected acoustically. By way of example, detecting the lighting up of a parking light and/or low beam of the second vehicle is interpreted as the desire to leave a parking space. "Ascertaining a desire to leave a parking space" may for example, as an alternative, be referred to as ascertaining initiation of a maneuver by the second vehicle for leaving a parking space. The vehicle desire is preferably a voice command that is received by the sensor device, in particular the microphone sensor. Step d) is initiated for example using voice control.

The parking assistance system preferably comprises a signal processing unit that is designed to process, for example to analyze, the received sensor signal in order to ascertain the desire to leave a parking space. The signal processing unit is in particular designed to evaluate voice commands and to classify them as a desire to leave a parking space.

The parking assistance system is designed for example to ascertain the desire to leave a parking space by fusing multiple sensor signals from different sensor devices.

If a desire to leave a parking space has been ascertained, then the first vehicle is driven away from the obstructive parking position by the parking assistance system. This may be achieved in various ways, depending on the relationship between the first vehicle and the second vehicle whose desire to leave a parking space has been ascertained.

In a first case, the first vehicle blocks the second vehicle having the desire to leave a parking space and thus prevents it from driving away. The parking assistance system will then initially drive the first vehicle into an intermediate position, such that the second vehicle is no longer blocked and is able to drive away. The parking assistance system then preferably drives the first vehicle into the parking space that has become free and parks it there.

In a second case, the first vehicle does not block the second vehicle having the desire to leave a parking space. The second vehicle may therefore drive away unhindered. In this second case, the parking assistance system preferably drives the first vehicle into the parking space that has become free and parks it there as soon as the second vehicle has driven away.

In both cases, the first vehicle is preferably parked in a regular parking space as soon as possible, and the obstructive parking position is thereby eliminated.

Preferably, the first vehicle is driven autonomously from the obstructive parking position to a position different from the obstructive parking position when a siren, a police siren or the like is received, in particular by the sensor device, in particular the microphone sensor.

According to one embodiment of the method, the obstructive parking position is a blocking parking position in which at least the second vehicle parked in the adjacent parking space is prevented from driving away by the first vehicle.

In the blocking parking position, multiple parked second vehicles may also be prevented from driving away.

According to a further embodiment of the method, the obstructive parking position is detected on the basis of a user input.

A user input comprises for example actuating a control element provided specifically for this purpose. By way of example, the indicator may be set to the right (if driving on the right is mandatory, alternatively to the left in countries where driving on the left is mandatory) to indicate to other road users that the first vehicle has been parked in the meantime.

The user input may be sufficient to detect the obstructive parking position, but it may also be only optional.

According to a further embodiment of the method, the sensor signal comprises an optical sensor signal.

The optical sensor signal is preferably a digital image, captured by a camera, of a region of the environment of the first vehicle. Such a digital image may be analyzed for example through image processing in order to ascertain the desire of the second vehicle to leave a parking space. For this purpose, the parking assistance system may comprise an image processing unit.

According to a further embodiment of the method, the sensor signal comprises an acoustic sensor signal.

The acoustic sensor signal is captured for example by a microphone and output to the parking assistance system. This makes it possible to detect noises such as for example an unlocking sound, the opening of a door, the closing of a door, the starting of an engine, a warning signal (horn) and/or a shout.

The acoustic sensor signal may also be captured by one or more ultrasonic sensors and output to the parking assistance system. By way of example, a movement, in particular an approach, of the second vehicle relative to the first vehicle may be ascertained by way of ultrasonic sensors.

According to a further embodiment of the method, the sensor signal comprises a haptic sensor signal.

The haptic sensor signal is captured for example by a vibration or acceleration sensor or a microphone and output to the parking assistance system. This may be used for example to detect knocking signals. Provision may be made here for a user of a second vehicle that is blocked in the parking position by the first vehicle to "knock" on the first vehicle, which is accordingly detected by the vibration sensor and may be interpreted by the parking assistance system as a desire to leave a parking space.

Such a knocking signal may also be captured by a microphone, as a result of which received sensor signals may be plausibility-checked against one another.

According to a further embodiment of the method, the sensor signal comprises a data signal received from an external device.

The data signal is received and detected for example by an antenna and/or a modem and output to the parking assistance system. The data signal may be received for example by way of Bluetooth®, NFC, WLAN, ZigBee and/or mobile radio. By way of example, a user of the second vehicle may transmit the data signal by way of a mobile device and/or the second vehicle transmits a "request to leave a parking space".

According to a further embodiment of the method, clearance from a user of the first vehicle is acquired before step d).

This embodiment ensures that the first vehicle is driven autonomously by the parking assistance system only in the event of authorization from the user of the first vehicle. The clearance may in particular take place through wireless data communication with a mobile device of the user. A vehicle key, which may be necessary to operate the first vehicle, may preferably be used for this function.

According to a further embodiment of the method, the first vehicle is parked autonomously in the parking space after the parked second vehicle has driven away from the parking space.

According to a further embodiment of the method, a length of the parked second vehicle is detected while it is leaving the parking space, wherein the autonomous parking is performed on the basis of the detected length.

This embodiment has the advantage that it is possible to ensure that the parking space that has become free is long enough for the first vehicle. A risk of collision or the like during autonomous parking is thus reduced.

In addition to the length, a width and/or a height of the second vehicle may also be detected and taken into account in the autonomous parking.

The length may be detected for example by way of image evaluation of a digital image of the second vehicle while leaving a parking space. Furthermore, provision may be made for model identification, wherein for example a model database is queried and returns the geometric data of the identified model.

According to a further embodiment of the method, it comprises the first vehicle at least temporarily outputting an information signal while it is in the obstructive parking position, wherein the information signal is indicative of the fact that the first vehicle has an automatic free parking function.

The information signal is preferably an optical signal, such as for example a projection. The information signal may also comprise permanent information, such as a QR code that is affixed to the vehicle. The information signal preferably comprises a data signal that is transmitted for example by way of Bluetooth®, NFC, WLAN, ZigBee, and/or mobile radio and that is able to be received for example by a nearby mobile device. A user of the second vehicle may be made aware by the information signal that the first vehicle has the automatic free parking function. The information signal may also comprise an instruction as to how the automatic free parking function may be triggered by the user of the second vehicle.

According to a further embodiment of the method, the information signal comprises an optical signal, in particular a projection, an acoustic signal and/or a digital data signal.

According to a second aspect, what is proposed is a computer program product that comprises commands that, when the program is executed by a computer, prompt said computer to perform the method according to the first aspect.

A computer program product, such as for example a computer program means, may for example be provided or supplied by a server in a network as a storage medium, such as for example a memory card, USB stick, CD-ROM, DVD, or else in the form of a downloadable file. This may take place for example in a wireless communication network by transferring a corresponding file containing the computer program product or the computer program means.

According to a third aspect, what is proposed is a parking assistance system for a first vehicle that is designed to autonomously drive the first vehicle. The parking assistance system comprises a detection unit for detecting an obstructive parking position of the first vehicle, wherein the obstructive parking position is a parking position adjacent to a parking space occupied by a parked second vehicle, a reception unit for receiving a sensor signal detected by a sensor device of the first vehicle, and an ascertainment unit for ascertaining a desire of the parked second vehicle to leave a parking space on the basis of the detected sensor signal. The parking assistance system is designed to steer the first vehicle autonomously from the obstructive parking position to a position different from the obstructive parking position on the basis of the ascertained desire to leave a parking space.

This parking assistance system is advantageously designed to perform the method according to the first aspect. The parking assistance system may in particular be part of a superordinate control device, such as for example an engine control unit (ECU), and/or share resources, such as a computing unit, a memory unit, a voltage supply and the like, with one or more other units or devices of the first vehicle.

The parking assistance system and/or a respective unit, for example the detection unit, the reception unit and/or the ascertainment unit, may be implemented in the form of hardware and/or in the form of software. In the case of an implementation in the form of hardware, the parking assistance system and/or the respective unit may be designed for example as a computer or as a microprocessor. In the case of an implementation in the form of software, the parking assistance system and/or the respective unit may be designed as a computer program product, as a function, as a routine, as part of a program code or as an executable object.

The embodiments and features described for the proposed method apply accordingly to the proposed parking assistance system.

According to a fourth aspect, what is proposed is a vehicle having a sensor device for detecting an environment of the vehicle and having a parking assistance system according to the third aspect.

Further possible implementations of the invention also comprise combinations of features or embodiments described above or below with regard to the exemplary embodiments and that are not explicitly mentioned. A person skilled in the art will in this case also add individual aspects as improvements or additions to the respective basic form of the invention.

Further advantageous refinements and aspects of the invention are the subject of the dependent claims and of the exemplary embodiments of the invention that are described below. The invention is explained in more detail below on the basis of preferred embodiments with reference to the accompanying figures.

Identical or functionally identical elements have been provided with the same reference signs in the figures, unless stated otherwise.

Figure 1:
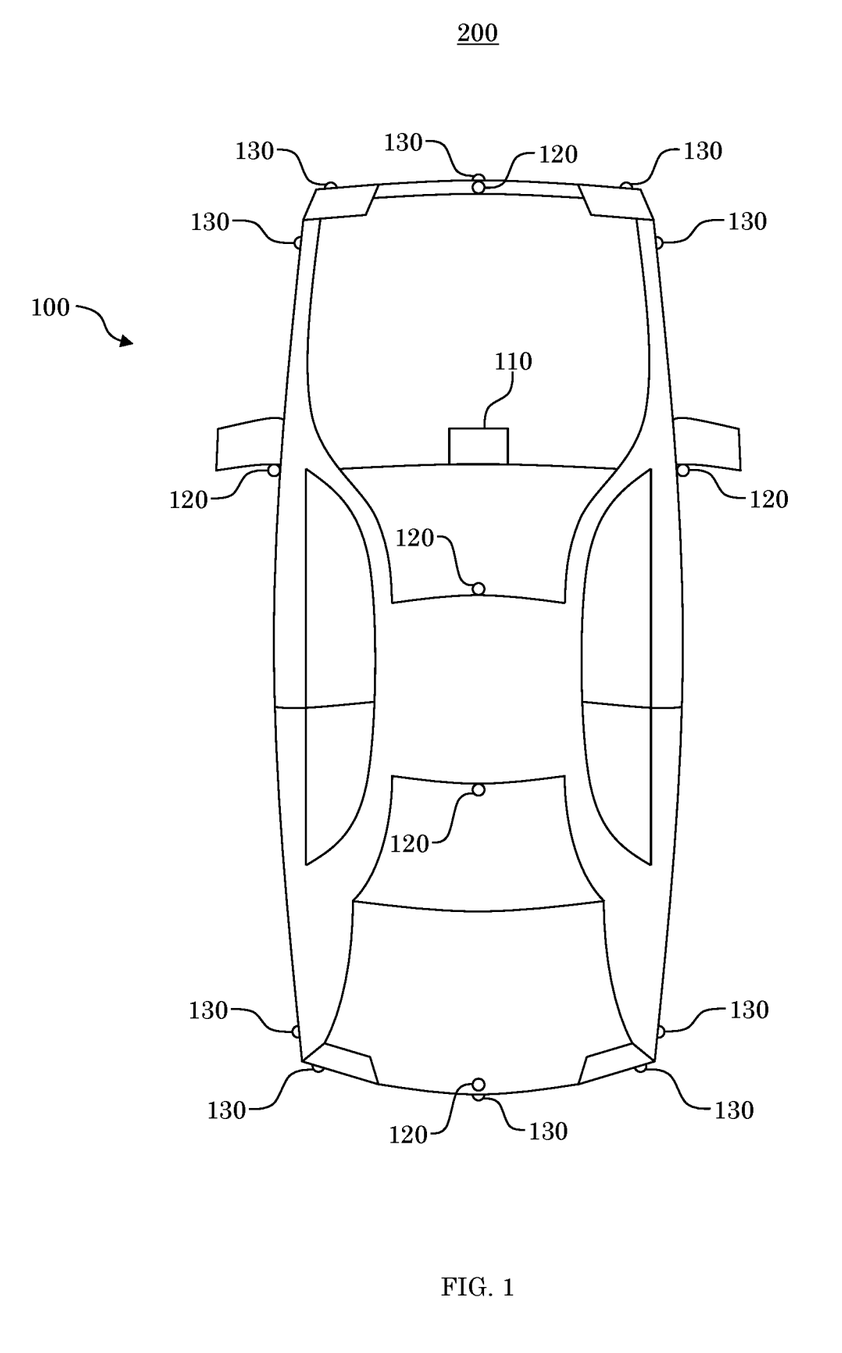
FIG. 1 shows a schematic view of a vehicle from a bird's eye view.

FIG. 1 shows a schematic view of a vehicle 100 from a bird's eye view. The vehicle 100 is for example a car that is arranged in an environment 200. The car 100 has a parking assistance system 110, which is designed for example as a control device. In addition, a plurality of sensor devices 120, 130 are arranged on the car 100, these being for example optical sensors 120 and ultrasonic sensors 130. The optical sensors 120 comprise for example visual cameras, a radar and/or a lidar. The optical sensors 120 may each capture an image of a respective region from the environment 200 of the car 100 and output it as an optical sensor signal. The ultrasonic sensors 130 are designed to detect a distance from objects arranged in the environment 200 and to output a corresponding sensor signal. Using the sensor signals detected by the sensors 120, 130, the parking assistance system 110 is able to drive the car 100 partially autonomously or even fully autonomously. In addition to the optical sensors 120 and ultrasonic sensors 130 illustrated in FIG. 1, provision may be made for the vehicle 100 to have various other sensor devices 120, 130. Examples of these are a microphone, an acceleration sensor, an antenna having a coupled receiver for receiving electromagnetically transmissible data signals, and the like.

Figure 2:
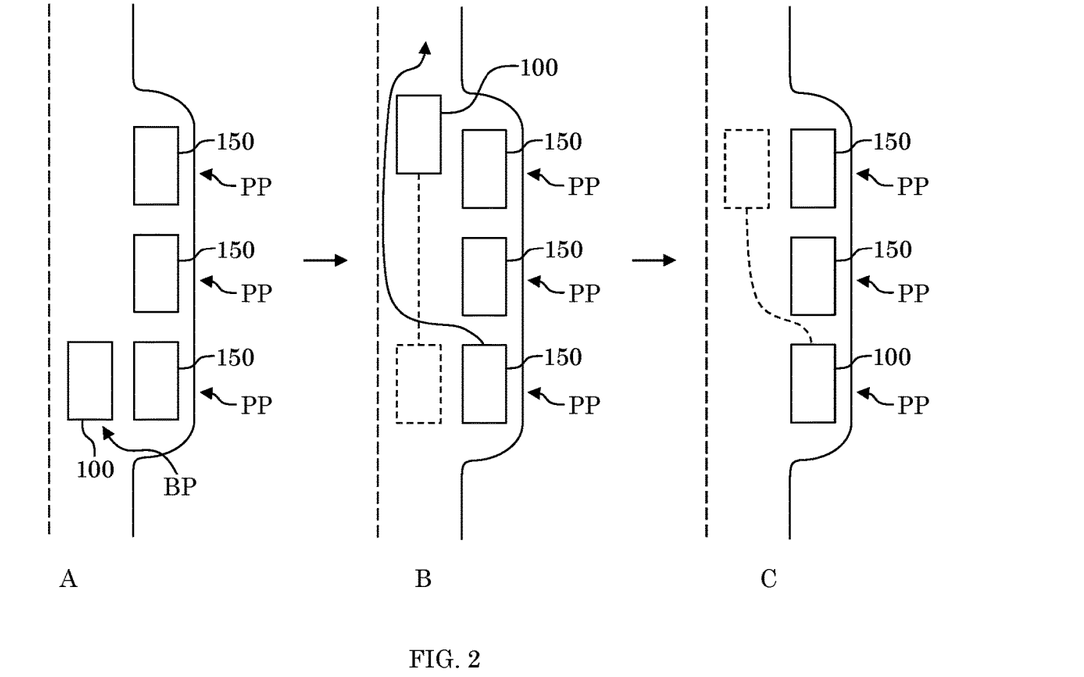
FIG. 2 schematically shows a first exemplary sequence of a method for autonomously re-parking a vehicle parked in an obstructive parking position.

FIG. 2 schematically shows, in three illustrations A, B, C arranged next to one another and each illustrating a different time, a first exemplary sequence of a method for autonomously re-parking a first vehicle 100 parked in an obstructive parking position BP, for example the car from FIG. 1. In FIG. 2, three parking spaces PP for parallel parking (longitudinal setup) are arranged in a parking bay on the side of a road.

Illustration A shows the initial situation. The three parking spaces PP are each occupied by a second vehicle 150. The first vehicle 100 is parked in the obstructive parking position BP. Here, the obstructive parking position BP corresponds to a blocking parking position, since the second vehicle 150 parked directly next to the first vehicle 100 is prevented from driving away by the first vehicle 100. It may also be said that the second vehicle 150 is boxed in. By way of example, the user of the boxed-in second vehicle 150 wishes to drive away. The parking assistance system 110 (see FIG. 1 or 4) of the first vehicle 100 first detects that the first vehicle 100 has been parked in an obstructive parking position BP. For example, the user of the first vehicle 100 has put the parking assistance system 110 into a listening mode, such that the parking assistance system 110 uses the sensor signals received by the sensor devices 120, 130 (see FIG. 1) of the first vehicle 100 to ascertain whether a desire of one of the second vehicles 150 to leave a parking space is present. As an alternative thereto, the parking assistance system 110 may however also derive, from surroundings monitoring, that the first vehicle 100 has been parked in the obstructive parking position BP.

By way of example, the user approaches the boxed-in second vehicle 150 and unlocks it with a radio signal, wherein the second vehicle 150 confirms the successful unlocking process by flashing its indicator devices in a visually identifiable manner. The radio signal is also detected for example by a corresponding sensor device 120, 130 of first vehicle 100; the visual flashing signal emanating from the second vehicle 150 is furthermore also detected by one of the sensor devices 120, 130 of the first vehicle 100.

The respective sensor device 120, 130 outputs the detected signal as a sensor signal to the parking assistance system 110, which receives the two sensor signals. The parking assistance system 110 then ascertains, based on the temporally close succession of the radio signal and the flashing signal, that the second vehicle 150 boxed in by the first vehicle 100 has been unlocked, and a desire to leave a parking space is therefore present. As an alternative, the driver assistance system 110 may for example wait for an engine of the second vehicle 150 to be started before it ascertains the desire to leave a parking space, since it may be the case that the user of second vehicle 150 just wants to put something in second vehicle 150 or retrieve something from it.

After the parking assistance system 110 has ascertained the desire of the boxed-in second vehicle 150 to leave a parking space, it drives the first vehicle 100 autonomously a few meters forward, such that the first vehicle 100 leaves the blocking parking position BP and the second vehicle 150 is able to drive away, as illustrated in the second illustration B.

Provision may then be made for the parking assistance system 110 to autonomously park the first vehicle 100 in the parking space PP that has become free, as illustrated in the third illustration C.

Figure 3:
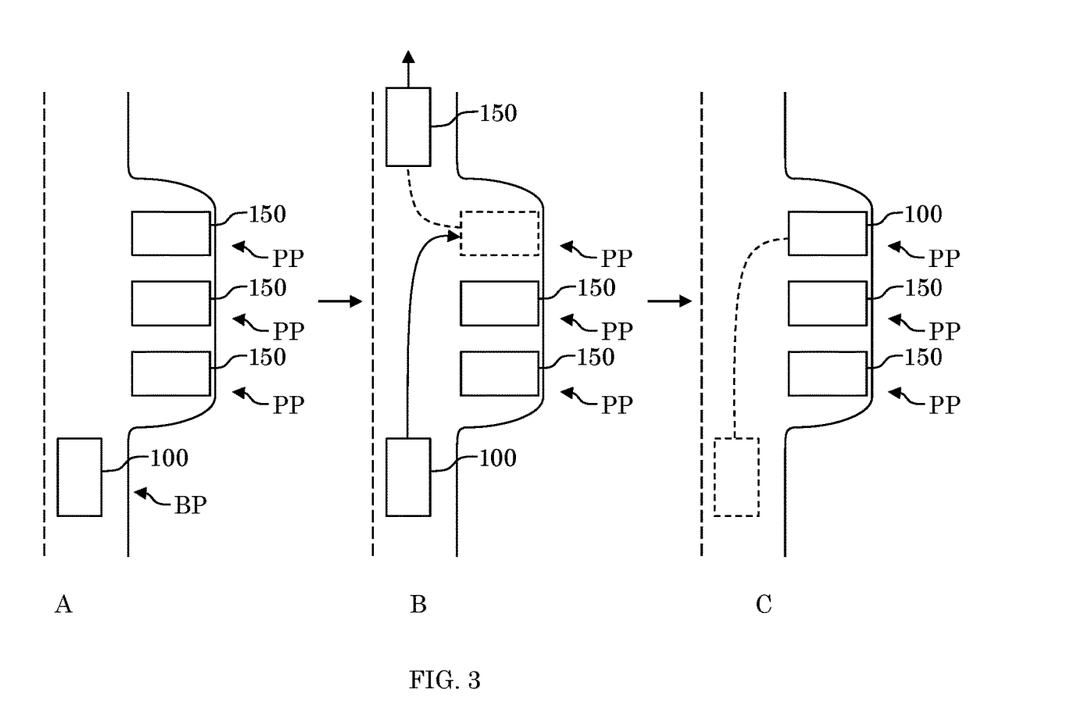
FIG. 3 schematically shows a second exemplary sequence of the method for autonomously re-parking a vehicle parked in an obstructive parking position.

FIG. 3 schematically shows a second exemplary sequence of the method for autonomously re-parking a first vehicle 100 parked in an obstructive parking position BP, for example the car from FIG. 1. In FIG. 3, three parking spaces PP for transverse parking (transverse setup) are arranged in a parking bay on the side of a road.

The first illustration A shows the initial situation. The first vehicle 100 is parked in an obstructive parking position BP, in which, although it does not block any of the second vehicles 150 parked in the parking spaces PP, it impedes the flow of traffic on the road. The obstructive parking position BP is a parking position adjacent to a parking space PP occupied by a parked second vehicle 150, since the parking bay with the three occupied parking spaces PP is located laterally in front of the first vehicle 100. A distance between the first vehicle 100 and the parking spaces PP is for example less than 10 m.

The parking assistance system 110 (see FIG. 1 or 4) of the first vehicle 100 detects that it has been parked in the obstructive parking position BP. By way of example, the parking assistance system 110 identifies, on the basis of images, captured by way of cameras, of the environment, that the first vehicle 110 has been parked on the road and not in a regular parking space PP. The parking assistance system 110 therefore monitors the surroundings of the first vehicle 100 in order to ascertain whether a desire of one of the parked second vehicles 150 to leave a parking space is present by virtue of receiving sensor signals from the sensor devices 120, 130 (see FIG. 1) of the first vehicle 100.

It is ascertained that a desire of one of the second vehicles 150 to leave a parking space is present. The first vehicle 100 does not have to be moved for the second vehicle 150 to be able to drive away. While the second vehicle 150 is driving away from the parking space PP (see illustration B), the parking assistance system 110 of the first vehicle 100 receives for example optical sensor signals from a sensor device 120, 130 of the first vehicle 100. On the basis of these optical sensor signals, the parking assistance system 110 ascertains a length of the second vehicle 150 driving away, in order to establish whether the parking space PP that has become free is long enough for the first vehicle 100.

In the present case, it is ascertained that the parking space PP is large enough for the parking assistance system 110 to park the first vehicle 100 autonomously in the parking space PP that has become free, as shown in illustration C. The first vehicle 100 is thus removed from the obstructive parking position BP and traffic is again able to flow unhindered.

Figure 4:
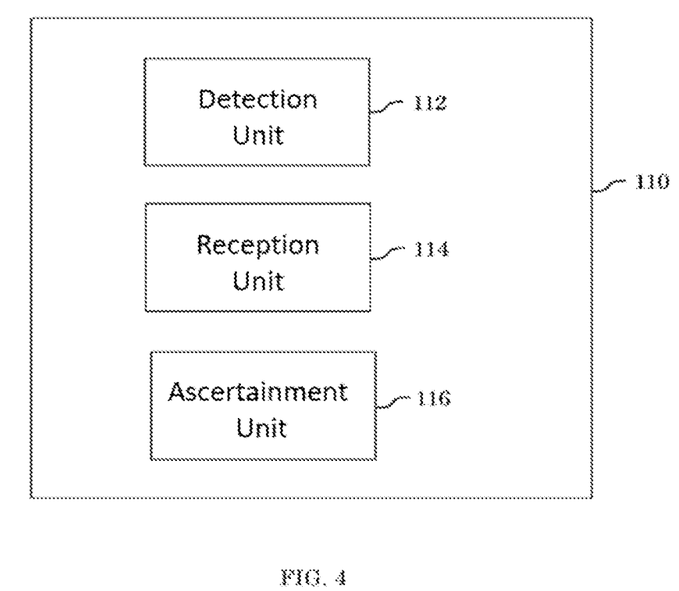
FIG. 4 shows a schematic block diagram of one exemplary embodiment of a parking assistance system.

FIG. 4 shows a schematic block diagram of one exemplary embodiment of a parking assistance system 110, for example for vehicle 100 from FIG. 1. The parking assistance system 110 is designed here as a computing unit that comprises a CPU and a memory, as well as interfaces in order to be able to exchange data with other units of the vehicle 100, in particular in order to control the autonomous driving of the vehicle 100.

The parking assistance system 110 comprises a detection unit 112 for detecting an obstructive parking position BP of the first vehicle 100. In this case, the detection unit 112 may for example detect a user input that is indicative of the obstructive parking position BP, and/or the detection unit 112 may determine, on the basis of sensor signals detected by sensor devices 120, 130 (see FIG. 1), that the first vehicle 100 has been parked in the obstructive parking position BP. The obstructive parking position BP is a parking position adjacent to a parking space PP (see FIG. 2 or 3) occupied by a parked second vehicle 150 (see FIG. 2 or 3).

Furthermore, the parking assistance system 110 comprises a reception unit 114 for receiving a sensor signal detected by a sensor device 120, 130 of the first vehicle 100. The sensor signal is in particular received as a digital data signal. The sensor signal is in particular indicative of an environment 200 (see FIG. 1) of the first vehicle 100.

Furthermore, the parking assistance system 110 comprises an ascertainment unit 116 for ascertaining a desire of the parked second vehicle 150 to leave a parking space on the basis of the detected sensor signal. The ascertainment unit 116 is in particular designed to jointly analyze a plurality of received sensor signals, that is to say for example to ascertain a correlation between a plurality of sensor signals received, possibly at different times and/or from different sensor devices 120, 130 of the vehicle 100, and to derive the desire to leave a parking space based thereon. This may be achieved for example based on fixed, predetermined rules.

If the ascertainment unit 116 ascertains a desire to leave a parking space, then the parking assistance system 110 drives the first vehicle 100 autonomously from the obstructive parking position BP to a position that differs from the obstructive parking position BP. The parking assistance system 110 preferably performs autonomous parking in the parking space PP that has become free.

Figure 5:
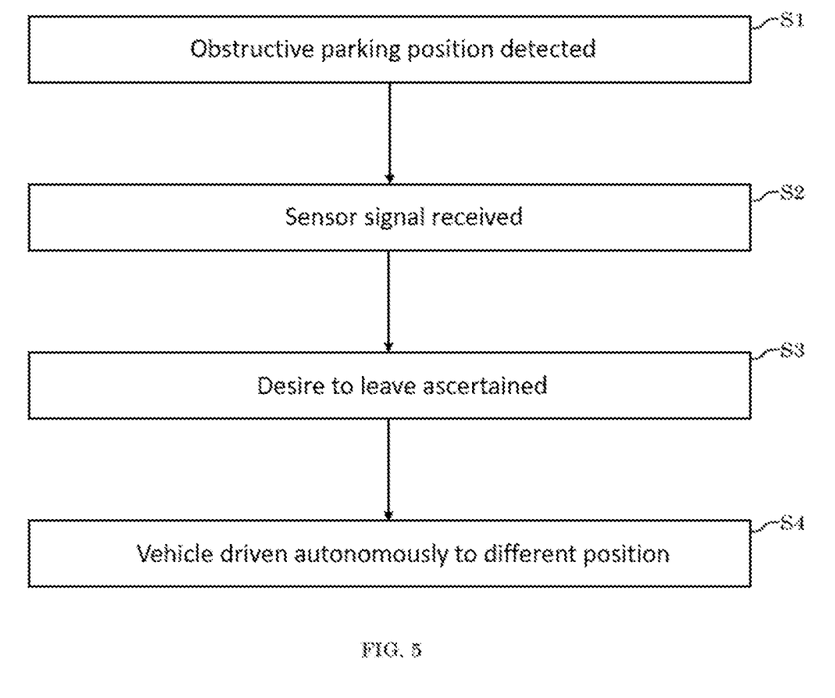
FIG. 5 shows a schematic block diagram of one exemplary embodiment of a method for operating a vehicle.

FIG. 5 shows a schematic block diagram of one exemplary embodiment of a method for operating a vehicle 100, for example the car 100 from FIG. 1. In a first step S1, an obstructive parking position BP (see FIG. 2 or 3) of the first vehicle 100 is detected by the parking assistance system 110 (see FIG. 1 or 4), wherein the obstructive parking position BP is a parking position adjacent to a parking space PP (see FIG. 2 or 3) occupied by a parked second vehicle 150 (see FIG. 2 or 3). In a second step S2, a sensor signal detected by a sensor device 120, 130 (see FIG. 1) of the vehicle 100 is received by the parking assistance system 110. In a third step S3, a desire of the parked second vehicle 150 to leave a parking space is ascertained by the parking assistance system 110 on the basis of the received sensor signal. In a fourth step S4, the first vehicle 100 is driven autonomously by the parking assistance system 110 from the obstructive parking position BP to a position different from the obstructive parking position BP on the basis of the ascertained desire to leave a parking space.

Although the present invention has been described on the basis of exemplary embodiments, it may be modified in many ways.

LIST OF REFERENCE SIGNS

| | |
|---|---|
| 100 | vehicle |
| 110 | parking assistance system |
| 112 | detection unit |
| 114 | reception unit |
| 116 | ascertainment unit |
| 120 | sensor device |
| 130 | sensor device |
| 150 | vehicle |
| 200 | environment |
| BP | obstructive parking position |
| PP | parking space |
| S1 | method step |
| S2 | method step |
| S3 | method step |
| S4 | method step |

The invention claimed is:

1. A method for operating a first vehicle having a parking assistance system, comprising:
   the parking assistance system detecting an obstructive parking position of the first vehicle, wherein the obstructive parking position is a parking position different from a regular parking space and adjacent to a parking space occupied by a parked second vehicle,
   the parking assistance system receiving a sensor signal detected by a sensor device of the first vehicle,
   the parking assistance system ascertaining a desire of the parked second vehicle to leave the parking space on the basis of the received sensor signal, and
   the parking assistance system autonomously driving the first vehicle from the obstructive parking position to a position different from the obstructive parking position on the basis of the ascertained desire to leave the parking space,
   wherein the obstructive parking position is a blocking parking position in which the first vehicle is impeding other vehicles in moving traffic.

2. The method as claimed in claim 1, wherein the obstructive parking position is a blocking parking position in which at least the second vehicle parked in the adjacent parking space is prevented from driving away by the first vehicle.

3. The method as claimed in claim 1, wherein the obstructive parking position is detected on the basis of a user input.

4. The method as claimed in claim 1, wherein the sensor signal comprises an optical sensor signal.

5. The method as claimed in claim 1, wherein the sensor signal comprises an acoustic sensor signal.

6. The method as claimed in claim 1, wherein the sensor signal comprises a haptic sensor signal.

7. The method as claimed in claim 1, wherein the sensor signal comprises a data signal received from an external device.

8. The method as claimed in claim 1, wherein clearance from a user of the first vehicle is acquired before autonomously driving.

9. The method as claimed in claim 1, further comprising:
   autonomously parking the first vehicle in the parking space after the parked second vehicle has driven away from the parking space.

10. The method as claimed in claim 9, further comprising: detecting a length of the parked second vehicle while it is leaving the parking space, wherein the autonomous parking is performed on the basis of the detected length, and wherein the parking space is transverse or parallel to the first vehicle.

11. The method as claimed in claim 1, further comprising: the first vehicle at least temporarily outputting an information signal while it is in the obstructive parking position, wherein the information signal is indicative of the fact that the first vehicle has an automatic free parking function.

12. The method as claimed in claim 11, wherein the information signal comprises an optical signal, an acoustic signal, and/or a digital data signal.

13. The method as claimed in claim 11, wherein the information signal comprises an instruction for triggering the automatic free parking function of the first vehicle.

14. The method as claimed in claim 11, wherein the information signal comprises a projection.

15. The method as claimed in claim 11, wherein the information signal comprises a broadcasted digital data signal.

16. The method as claimed in claim 11, wherein the information signal comprises a QR code.

17. A non-transitory machine-readable medium comprising a plurality of machine-readable instructions executed by one or more processors, the plurality of machine-readable instructions causing the one or more processors to perform operations for operating a first vehicle having a parking assistance system, the operations comprising:
the parking assistance system detecting an obstructive parking position of the first vehicle, wherein the obstructive parking position is a parking position different from a regular parking space and adjacent to a parking space occupied by a parked second vehicle,
the parking assistance system receiving a sensor signal detected by a sensor device of the first vehicle,
the parking assistance system ascertaining a desire of the parked second vehicle to leave the parking space on the basis of the received sensor signal, and
the parking assistance system autonomously driving the first vehicle from the obstructive parking position to a position different from the obstructive parking position on the basis of the ascertained desire to leave the parking space,
wherein the obstructive parking position is a blocking parking position in which the first vehicle is impeding other vehicles in moving traffic.

18. A parking assistance system for a first vehicle that is designed to autonomously drive the first vehicle, comprising:
a detection unit for detecting an obstructive parking position of the first vehicle, wherein the obstructive parking position is a parking position different from a regular parking space and adjacent to a parking space occupied by a parked second vehicle;
a reception unit for receiving a sensor signal detected by a sensor device of the first vehicle; and
an ascertainment unit for ascertaining a desire of the parked second vehicle to leave the parking space on the basis of the detected sensor signal, wherein the parking assistance system autonomously drives the first vehicle from the obstructive parking position to a position different from the obstructive parking position on the basis of the ascertained desire to leave the parking space,
wherein the obstructive parking position is a blocking parking position in which the first vehicle is impeding other vehicles in moving traffic.

19. A vehicle having a sensor device for detecting an environment of the vehicle and having a parking assistance system as claimed in claim 18.

* * * * *